United States Patent
Stall

(10) Patent No.: US 7,917,909 B2
(45) Date of Patent: Mar. 29, 2011

(54) DETECTING DEADLOCKS IN INTEROP-DEBUGGING

(75) Inventor: Jonathon Michael Stall, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 942 days.

(21) Appl. No.: 11/419,965

(22) Filed: May 23, 2006

(65) Prior Publication Data

US 2007/0288939 A1    Dec. 13, 2007

(51) Int. Cl.
*G06F 9/46* (2006.01)
(52) U.S. Cl. ........................................................ 718/106
(58) Field of Classification Search .................. None
See application file for complete search history.

(56) References Cited

U.S. PATENT DOCUMENTS

| | | | |
|---|---|---|---|
| 2004/0139386 A1* | 7/2004 | Ishimura et al. | 715/500 |
| 2007/0143766 A1* | 6/2007 | Farchi et al. | 718/104 |

OTHER PUBLICATIONS

Carver Richard H., Yu Lei, A general model for reachability testing of concurrent programs, Nov. 8-12, 2004, Springer Berlin / Heidelberg, vol. 3308/2004, p. 76-98.*

Robert Ian Oliver, Designing Enterprise Applications with Microsoft Visual Basic .NET, Microsoft Press; 1 edition (Oct. 16, 2002), p. 308.*

* cited by examiner

*Primary Examiner* — Li B Zhen
*Assistant Examiner* — Kimberly Jordan

(57) ABSTRACT

A method and system for implementing detecting deadlocks in interop-debugging is described herein. One or more synchronization objects that an application program interface (API) could block on are identified. A canary thread that takes one or more of the synchronization objects is created. The canary thread is called to take the one or more synchronization objects. If the canary thread returns within a predetermined timeout period, then the one or more synchronization objects are available and safe to take. If the canary thread does not return within the predetermined timeout period, then the one or more synchronization objects may not be available.

18 Claims, 5 Drawing Sheets

400

```
// globals
Int m_AnswerCounter = 0;
Int m_RequestCounter = 0;
Event m_pingEvent;
Event m_waitEvent;
Thread m_canaryThread;

// Called on helper thread
Bool AreLocksAvailable() {
        // create the canary if it doesn't exist yet. It will immediately run the thread proc
        If (m_canaryThread == NULL) {
                m_pingEvent = CreateAutoResetEvent();
                m_waitEvent = CreateManualResetEvent();
                m_canaryThread = CreateThread(CanaryThreadProc);
        } m_RequestCounter++;
        m_WaitEvent.Reset(); // canary sets when free
        m_PingEvent.Set(); // request canary to run int retry=0;
        int maxRetry = /* some threshold to spin */
        while(m_RequestCounter != m_AnswerCounter) {
                retry++;
                if (retry > maxRetry) return false;
                WaitForSingleObject(m_hWaitEvent, /* sleep timeout */);
                ResetEvent(m_hWaitEvent);
        } return true;
}

Void CanaryThreadProc() {
        While(true) {
                WaitForSingleObject(pingEvent, INFINITE);
                m_AnswerCounter=0;
                DWORD dwRequest = m_RequestCounter;

SniffLocks(); // same as above, take & release locks of interest.

m_AnswerCounter = dwRequest;
                SetEvent(waitEvent);
        }
}
```

402 → m_RequestCounter++;
404 → DWORD dwRequest = m_RequestCounter;
406 → m_AnswerCounter = dwRequest;

FIG. 4

DETECTING DEADLOCKS IN INTEROP-DEBUGGING

BACKGROUND

Debugging typically involves the use of a debugger, a tool that allows a software developer to observe run-time behavior of a computer program and locate errors. Some debugging commands such as a stop command allow the programmer to halt execution of a running process at any time, while manual insertion of breakpoints allow the programmer to halt the process when predetermined points in the code have been reached. The debuggee runs free until it hits a break op-code in the instruction stream, at which point the operating system (OS) will halt the debuggee until the debugger continues the debuggee. Thus, when debugging a computer-program, the program is either running (i.e., executing as a process) or halted. Certain debugging commands, such as step-into, step over, and step-out commands, can be initiated only in break mode (i.e. when the debuggee is halted), and allow the programmer to step through the program state, observer, and/or modify content of variables, pointers, and/or the like.

A common method to implement debuggers for Virtual Machines (VMs) involves having a helper thread running in the debuggee process to service debugger requests. Extending this to interop-debugging (i.e. debugging both native and managed code together) introduces the problem that the helper thread may block on some native portion of the program being debugged and cause the whole system to be deadlocked. Specifically, suppose that a native thread T is stopped by the debugger while holding a lock L. The debugger will not resume native thread T until it makes some calls to the helper thread. However, the helper thread may attempt to take lock L. The helper thread would then block on the native thread T. The native thread T is blocked on the debugger. The debugger is blocked on the helper thread. Therefore, the whole system is deadlocked.

One approach to solving this problem is to have the helper thread check if locks are available before taking them, but this requires knowing which locks are going to be taken by the helper thread and to be able to query for them. However, OS Application Program Interfaces (APIs) usually do not publish the internal locks they take and even when they do, the locks may change from version to version, making it difficult to know which locks will be taken. Furthermore, OS APIs usually do not provide a way to query for these locks.

Another approach may be to avoid all OS APIs. However, the OS may have functionality the helper thread needs to perform its job, such as allocating or freeing memory. Also, the helper thread generally calls into other parts of the VM to make queries and these parts of the VM may call OS APIs. Therefore, taking this approach is impractical.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are various technologies and techniques directed to methods and systems for detecting deadlocks in interop-debugging. In accordance with one implementation of the described technologies, one or more synchronization objects, such as locks, that an API could block on are identified. A canary thread is created to help determine whether the one or more synchronization objects are available and safe to take. The canary thread is called to sniff out the one or more synchronization objects. If the canary thread returns within a predetermined timeout period, then the one or more synchronization objects are available and safe to take. If the canary thread does not return within the predetermined timeout period, then the one or more synchronization objects may not be available.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 4 illustrates another exemplary pseudo code implementation of detecting deadlocking in interop-debugging.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

"Threads," as described herein, may refer to execution paths within an application, program, function, or other assemblage of programmable and executable code. Threads enable multiple paths or streams of execution of modules of code to occur concurrently within the same application, program, function, or other assemblage of programmable and executable code; whereby, within each stream, a different transaction or message may be processed. A multitasking or multiprocessing environment, in which multi-threading processes may be executed, may be found in either a managed execution environment or an unmanaged execution environment.

Figure 1:
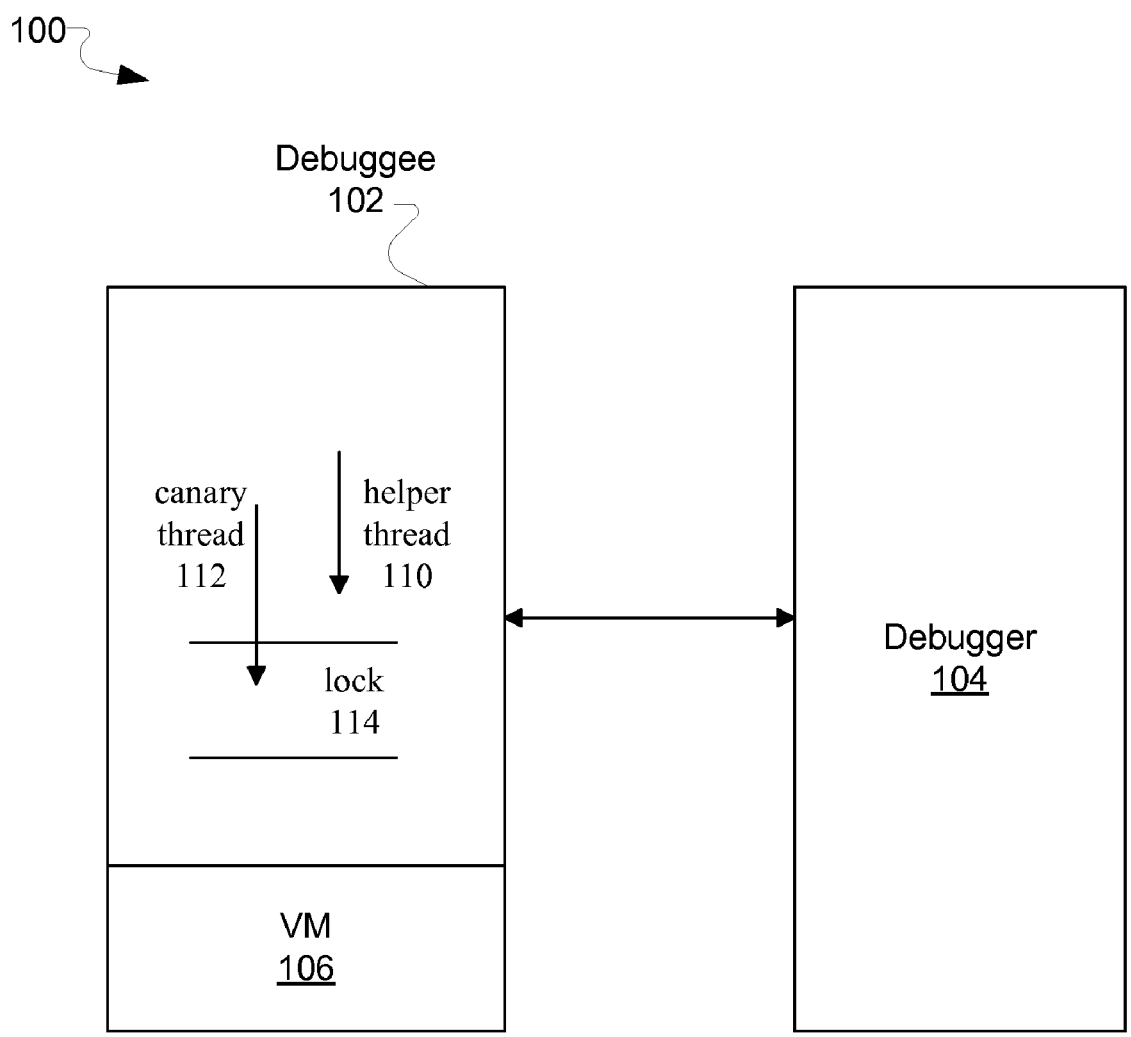
FIG. 1 is a block diagram illustrating an exemplary system for detecting deadlocking in interop-debugging.

FIG. 1 is a block diagram illustrating an exemplary system 100 for implementing detecting deadlocks in interop-debugging. One method to implement debuggers for a Virtual Machines (VM), such as 106, is to have a helper thread 110 running in the debuggee 102 to service requests of the debugger 104. The debuggee process can be in two states: live or synchronized. In a live state, the threads are running free. Native threads may take locks, but they will continue executing and thus shortly release the locks. In a synchronized state, the helper thread is unblocked and executing cross-process requests from the debugger. Other threads are hard suspended. The other threads may be holding locks that the helper thread needs in order to process messages. Since the other threads are hard suspended, the set of locks that they hold is constant until the debuggee goes back to a live state again.

The helper thread 110 may block on some native portion of the program being debugged when a native thread is stopped by the debugger 104 while holding a lock. For example, suppose that a native thread is stopped by the debugger 104 while holding a lock 114. The debugger 104 will not resume the native thread until it makes some calls to the helper thread 110. However, the helper thread 110 may attempt to take the lock 114. The helper thread would then block on the native thread. The native thread is blocked on the debugger. The debugger is blocked on the helper thread. Therefore, the whole system may be deadlocked.

In the exemplary system 100 shown in FIG. 1, a canary thread 112 is used to sniff out the locks the helper thread 110 would take. The canary thread 112 takes the locks and then releases them. The canary thread may take the locks directly (if known), or indirectly by calling the associated problematic OS APIs that the helper thread would call. When the helper thread 110 receives a request from the debugger 104, the helper thread 110 pings the canary thread 112 to sniff out the locks. If the canary thread 112 returns within a predetermined timeout, the locks are known to be free. Furthermore, since the lockset is not changing, the locks will remain free while the debuggee is stopped, so this sniffing operation only needs to happen once per stop-state. If the canary thread 112 does not return within the timeout, then the helper thread 110 assumes the canary thread 112 is blocked on one of the locks, and therefore the locks are not safe to take. The helper thread 110 may then immediately return a graceful failure without even trying to take the problematic locks.

Figure 2:
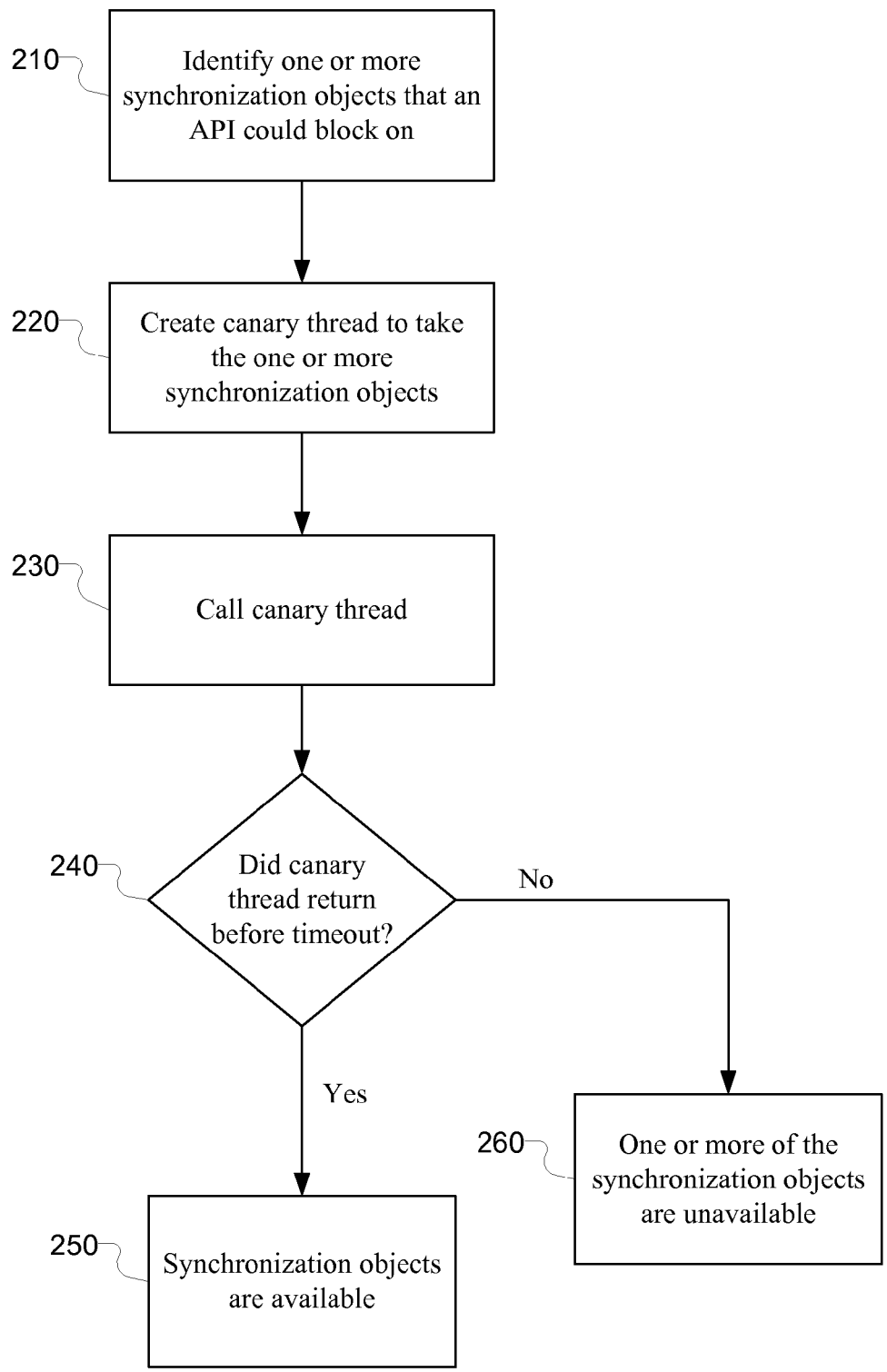
FIG. 2 is a flow diagram illustrating an exemplary process for detecting deadlocking in interop-debugging.

FIG. 2 is a flow diagram illustrating an exemplary process for detecting deadlocks in interop-debugging. While the description of FIG. 2 may be made with reference to other figures, it should be understood that the exemplary process illustrated in FIG. 2 is not intended to be limited to being associated with the systems or other contents of any specific figure or figures. Additionally, it should be understood that while the exemplary process of FIG. 2 indicates a particular order of operation execution, in one or more alternative implementations, the operations may be ordered differently. Furthermore, some of the steps and data illustrated in the exemplary process of FIG. 2 may not be necessary and may be omitted in some implementations. Finally, while the exemplary process of FIG. 2 contains multiple discrete steps, it should be recognized that in some environments some of these operations may be combined and executed at the same time.

At 210, one or more synchronization objects that an API could block on are identified. Examples of synchronization objects that may be identified include but are not limited to locks, mutexes, monitors, signable events, and semaphores. At 220, a canary thread that takes the one or more synchronization objects is created. At 230, the canary thread is called to take the one or more synchronization objects. At 240, a determination is made as to whether the canary thread returned within a predetermined timeout period. If so, then at 250, it is determined that the one or more synchronization objects are available and safe to take. If the canary thread does not return within the timeout period, then at 260, it is determined that one or more of the synchronization objects are unavailable.

Figure 3:
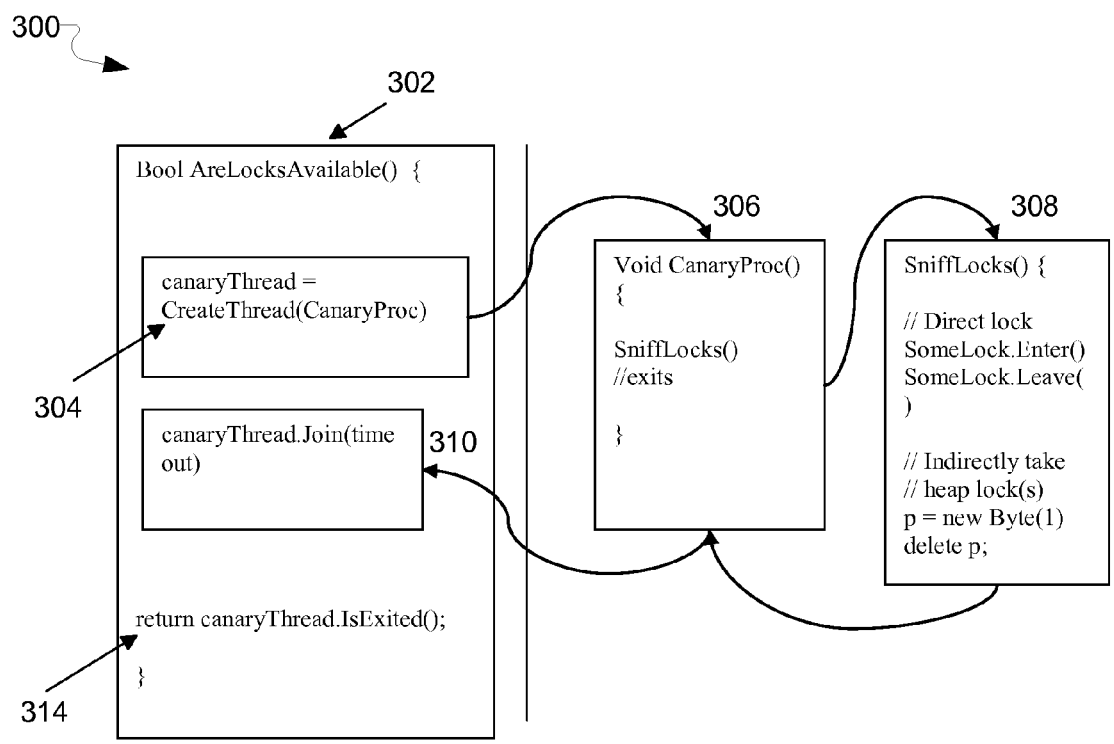
FIG. 3 is a diagram illustrating an exemplary pseudo code implementation of detecting deadlocking in interop-debugging.

FIG. 3 is a diagram 300 illustrating an exemplary pseudo code implementation 300 of detecting deadlocking in interop-debugging. A helper thread may call the function AreLocksAvailable( ) 302 to determine if the locks are available. In this exemplary implementation, the function AreLocksAvailable( ) 302 returns true if the locks are available and safe for the helper thread to take. Otherwise, the function AreLocksAvailable( ) 302 returns false. The function AreLocksAvailable( ) 302 creates a canary thread, as shown at 304. The thread procedure CanaryProc( ) 306 is then run. CanaryProc( ) 306 takes the locks via a call to SniffLocks( ) 308. SniffLocks( ) 308 may directly take locks that are known or indirectly take locks by calling other idempotent APIs that take locks. For instance, in the example shown in FIG. 3, SniffLocks( ) 308 takes a known lock "someLock" directly and indirectly takes heap locks by using New( ) and Delete( ) as shown. If the locks are available, then the canary thread will take and release the locks in SniffLocks( ) 308 and then the thread procedure CanaryProc( ) 306 will exit. If one or more locks are taken, then the canary thread will block in Snifflocks( ) 308.

At 310, the function AreLocksAvailable( ) 302 waits for a predetermined timeout. The timeout may be any predetermined amount of time, such as for example, 100 ms. At 314, if the canary thread has exited, then the function AreLocksAvailable( ) 302 returns true to indicate that the locks are available. If the canary thread has not exited, then the function AreLocksAvailable( ) 302 returns false to indicate that one or more of the locks may be taken and unavailable. In the latter case, the helper thread may return a graceful failure. Then, when the debuggee is resumed, SniffLocks( ) 308 will acquire and release the locks, and the canary thread will exit.

FIG. 4 shows another exemplary pseudo code implementation 400 of detecting deadlocking in interop-debugging. In this example implementation, a single canary thread is reused across a plurality of synchronized states. The first call to AreLocksAvailable( ) creates the canary thread. Each call to AreLocksAvailable( ) will increment the RequestCounter, as shown at 402. The thread procedure CanaryThreadProc( ) will take a snapshot of the request counter (dwRequest), as shown at 404, before it sniffs the locks. CanaryThreadProc( ) will then provide that snapshot back (via AnswerCounter), as shown at 406, when it finishes sniffing the locks. Thus, when the helper sees the canary thread come back, it can correlate the RequestCounter with the AnswerCounter to ensure that that the canary thread sniffs out all locks within one request.

If the locks are available, the canary thread will cache dwRequest to RequestCounter, run through SniffLocks( ), set AnswerCounter to dwRequest, and then ping the waitEvent. Since this will be within the timeout, RequestCounter has not changed and so AnswerCounter and RequestCounter will be equal. AreLocksAvailable( ) will break out of the loop and return true.

If the locks are held, the canary thread will cache dwRequest to the current value of RequestCounter and block in SniffLocks( ). AreLocksAvailable( ) will eventually timeout and return false. The process will eventually continue and CanaryThreadProc( ) will unblock and set AnswerCounter to the stale version of RequestCounter. At some future call to AreLocksAvailable( ), RequestCounter will be incremented. AreLocksAvailable( ) will see that AnswerCounter is not equal to RequestCounter and thus loop and reping the canary thread for a current lock sniff.

Figure 5:
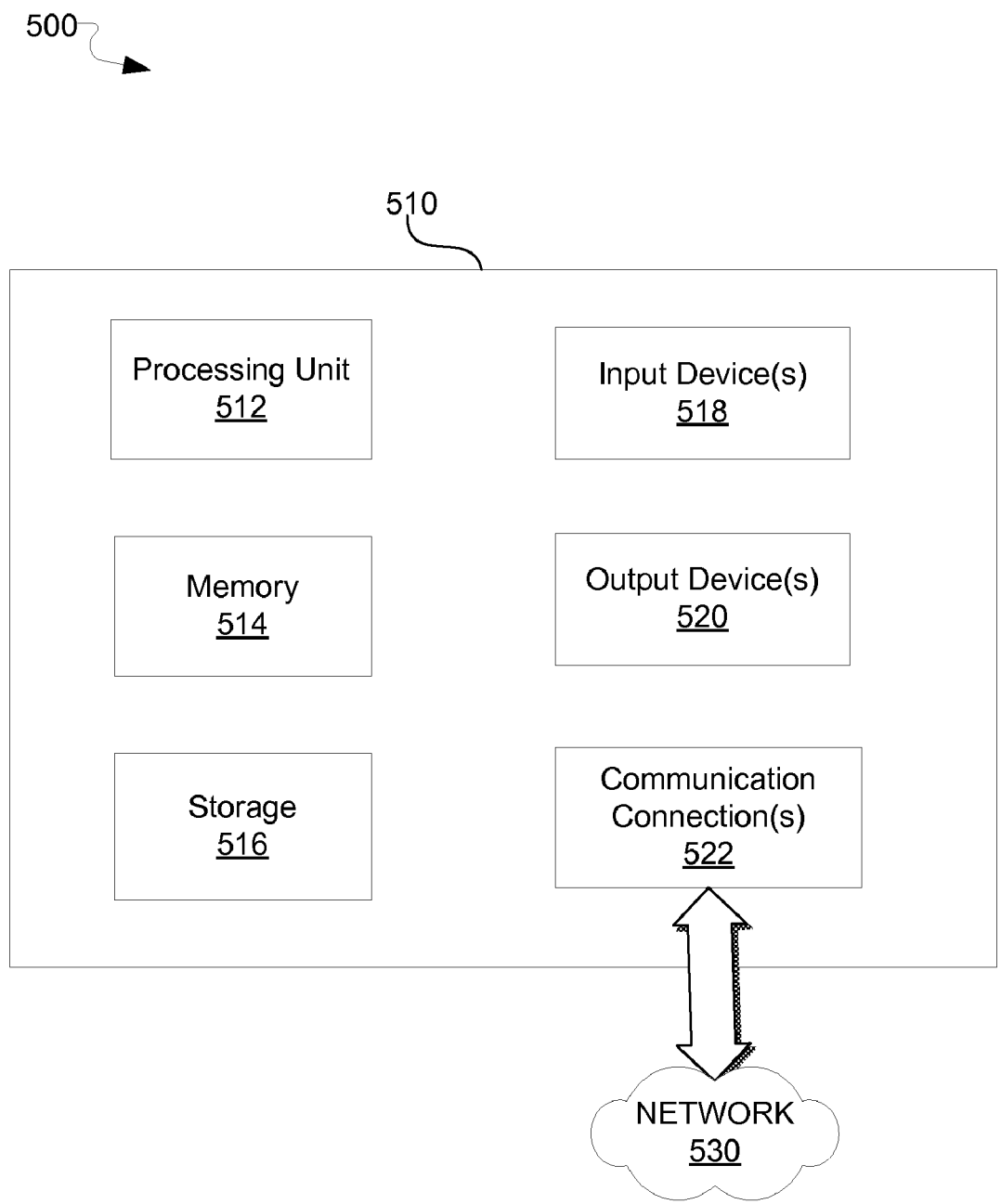
FIG. 5 illustrates an exemplary computing environment in which certain aspects of the invention may be implemented.

FIG. 5 illustrates an exemplary computing environment in which certain aspects of the invention may be implemented. It should be understood that computing environment 500 is only one example of a suitable computing environment in which the various technologies described herein may be employed and is not intended to suggest any limitation as to the scope of use or functionality of the technologies described herein. Neither should the computing environment 500 be interpreted as necessarily requiring all of the components illustrated therein.

The technologies described herein may be operational with numerous other general purpose or special purpose computing environments or configurations. Examples of well known computing environments and/or configurations that may be suitable for use with the technologies described herein include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

With reference to FIG. 5, computing environment 500 includes a general purpose computing device 510. Components of computing device 510 may include, but are not limited to, a processing unit 512, a memory 514, a storage device 516, input device(s) 518, output device(s) 520, and communications connection(s) 522.

Processing unit 512 may include one or more general or special purpose processors, ASICs, or programmable logic chips. Depending on the configuration and type of computing device, memory 514 may be volatile (such as RAM), non-volatile (such as ROM, flash memory, etc.) or some combination of the two. Computing device 510 may also include additional storage (removable and/or non-removable) including, but not limited to, magnetic or optical disks or tape. Such additional storage is illustrated in FIG. 5 by storage 516. Computer storage media includes volatile and nonvolatile, removable and non-removable media implemented in any method or technology for storage of information such as computer readable instructions, data structures, program modules or other data. Memory 514 and storage 516 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 510. Any such computer storage media may be part of computing device 510.

Computing device 510 may also contain communication connection(s) 522 that allow the computing device 510 to communicate with other devices, such as with other computing devices through network 530. Communications connection(s) 522 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes storage media.

Computing device 510 may also have input device(s) 518 such as a keyboard, a mouse, a pen, a voice input device, a touch input device, and/or any other input device. Output device(s) 520 such as one or more displays, speakers, printers, and/or any other output device may also be included.

While the invention has been described in terms of several exemplary implementations, those of ordinary skill in the art will recognize that the invention is not limited to the implementations described, but can be practiced with modification and alteration within the spirit and scope of the appended claims. The description is thus to be regarded as illustrative instead of limiting.

The invention claimed is:

1. A computer-implemented method comprising:
identifying one or more synchronization objects that an application program interface (API) could block on;
responsive to receiving a debugger request for a helper thread, creating, by the helper thread, a canary thread, wherein:
the canary thread attempts to take and release the one or more synchronization objects, and
the one or more synchronization objects are takeable by the helper thread in response to the debugger request;
determining whether the canary thread exits and returns to the helper thread within a predetermined timeout period; and,
when the canary thread exits and returns to the helper thread within the predetermined timeout period, determining that the one or more synchronization objects are free to take; and
when the canary thread does not exit and return to the helper thread within the predetermined timeout period, returning a graceful failure from the helper thread without trying to take the one or more synchronization objects.

2. The method of claim 1, wherein the canary thread takes the one or more synchronization objects directly.

3. The method of claim 1, wherein the canary thread takes the one or more synchronization objects indirectly.

4. The method of claim 1, wherein the one or more synchronization objects include one or more locks.

5. The method of claim 1, wherein the one or more synchronization objects include one or more mutexes.

6. The method of claim 1, wherein the one or more synchronization objects include one or more monitors.

7. The method of claim 1, wherein the one or more synchronization objects include one or more signable events.

8. The method of claim 1, wherein the one or more synchronization objects include one or more semaphores.

9. One or more device-readable storage media with device-executable instructions stored thereon which, when executed by a processing unit, perform:
identifying one or more synchronization objects that an application program interface (API) could block on;
responsive to receiving a debugger request for a helper thread, calling, by the helper thread, a canary thread, wherein the canary thread attempts to both take and release the one or more synchronization objects before returning to the helper thread;
counting when the one or more synchronization objects are taken and released based on the attempts by the canary thread;
determining whether the one or more synchronization objects are free to take, based on the counting; and
when the counting does not indicate that the one or more synchronization objects are free to take, returning a graceful failure from the helper thread without trying to take the one or more synchronization objects.

10. The device-readable storage media according to claim 9, further comprising device-executable instructions which, when executed by the processing unit, perform:

reusing the canary thread across a plurality of synchronized states.

11. The device-readable storage media according to claim 9, wherein counting includes updating, by the canary thread, at least one global counter accessible to both the canary thread and the helper thread;

and further comprising device-executable instructions which, when executed by the processing unit, perform:

determining, by the helper thread, whether the one or more synchronization objects are free to take based on the at least one global counter that is updated by the canary thread.

12. The device-readable storage media according to claim 9, wherein the canary thread takes the one or more synchronization objects directly.

13. The device-readable storage media according to claim 9, wherein the canary thread takes the one or more synchronization objects indirectly.

14. The device-readable storage media according to claim 9, wherein the one or more synchronization objects comprise locks, mutexes, monitors, signable events, or semaphores.

15. A system comprising:

a helper thread;

a canary thread; and a processing unit configured to execute the canary thread and the helper thread;

the helper thread being configured to:

identify one or more synchronization objects that may be taken by the canary thread; and create the canary thread;

the canary thread being configured to:

attempt to take and release the one or more synchronization objects; and exit and return to the helper thread after releasing the one or more synchronization objects;

the helper thread being further configured to:

determine whether the canary thread exits and returns to the helper thread within a predetermined timeout period;

when the canary thread exits and returns to the helper thread within the predetermined timeout period, determine that the one or more synchronization objects are free to take; and when the canary thread does not exit and return to the helper thread within the predetermined timeout period, determine not to take the one or more synchronization objects.

16. The system according to claim 15, wherein the canary thread takes the one or more synchronization objects directly.

17. The system according to claim 15, wherein the canary thread takes the one or more synchronization objects indirectly.

18. The system according to claim 15, wherein the one or more synchronization objects comprise locks, mutexes, monitors, signable events, or semaphores.

* * * * *